(12) United States Patent
Lonnberg et al.

(10) Patent No.: US 10,967,778 B2
(45) Date of Patent: Apr. 6, 2021

(54) EDGE PROTECTORS FOR LOAD SECUREMENT

(71) Applicant: American Railroad Supply, LLC, Portland, OR (US)

(72) Inventors: Theodore Lonnberg, Portland, OR (US); Casey Fordyce, Portland, OR (US)

(\*) Notice: Subject to any disclaimer, the term of this patent is extended or adjusted under 35 U.S.C. 154(b) by 0 days.

(21) Appl. No.: 17/070,690

(22) Filed: Oct. 14, 2020

(65) Prior Publication Data

US 2021/0023978 A1 Jan. 28, 2021

Related U.S. Application Data

(60) Provisional application No. 63/055,200, filed on Jul. 22, 2020.

(51) Int. Cl.
*B60P 7/08* (2006.01)
*B61D 45/00* (2006.01)

(52) U.S. Cl.
CPC .......... *B60P 7/0869* (2013.01); *B61D 45/007* (2013.01)

(58) Field of Classification Search
CPC ..... B60P 7/0869; B61D 45/007; B65D 71/04; B65D 81/053; B65D 81/054; B65D 2571/00117

USPC ............................................. 410/41, 99, 155
See application file for complete search history.

(56) References Cited

U.S. PATENT DOCUMENTS

| 968,455 | A | * | 8/1910 | Eastabrook | |
| 3,152,693 | A | * | 10/1964 | Anderson | B65D 71/04 410/99 |
| 5,878,548 | A | * | 3/1999 | Sauer | B60P 7/0869 410/99 |
| 7,407,353 | B2 | * | 8/2008 | George | B60P 7/0869 410/41 |

\* cited by examiner

*Primary Examiner* — Stephen T Gordon
(74) *Attorney, Agent, or Firm* — Mohr Intellectual Property Law Solutions, PC (57) ABSTRACT

Edge protectors to protect cargo from damage caused by a cable. The edge protectors include a body, a first retainer, and a first ramp. The body is complementarily configured with an edge of the cargo and is configured to cover the edge when the cable secures the cargo. The first retainer is mounted to the body and is configured to receive and laterally retain the cable when the cable secures the cargo. The first ramp is mounted to the body proximate the first retainer. The first ramp is configured to guide the cable into the first retainer and is configured to cooperate with the first retainer to laterally retain the cable in the first retainer when the cable secures the cargo. In some examples, the edge protector includes a second retainer, a second ramp, and/or a bolster.

17 Claims, 9 Drawing Sheets

EDGE PROTECTORS FOR LOAD SECUREMENT

CROSS REFERENCE TO RELATED APPLICATIONS

This application claims priority to U.S. Application Ser. No. 63/055,200, filed on Jul. 22, 2020, which is hereby incorporated by reference for all purposes.

BACKGROUND

The present disclosure relates generally to edge protectors. In particular, edge protectors used with high-strength cables to secure cargo are described.

Transporting cargo safely, efficiently, and economically is vital to systems of distributed commerce. Cargo is often transported overseas on large ships and transferred to railcars or trucks for delivery to destinations farther down the distribution chain. Securing cargo on ships, railcars, and trucks enables the cargo to be delivered long distances safely and without damage to the cargo or delivery vehicles.

Delivery vehicles often include tie-down assemblies or systems with high-strength cables and winches or ratchets to secure cargo in place. One example of a delivery vehicle with a system of cables and winches is a centerbeam railcar. Centerbeam railcars include an elevated beam extending along the longitudinal center of the railcar along with a plurality of winches disposed along the outer periphery of the railcar. Cargo is loaded underneath the central beam, cables are placed over the cargo, and then the cables are winched down tight on the cargo to secure the cargo in place on the railcar. Semi-trucks and other road vehicles may include similar cable and winch systems.

Cable and winch systems often utilize edge protectors to assist with securing cargo. Edge protectors are devices that protect the cargo from damage due to the cable exerting compressive forces on localized areas of the cargo, such as on an outer edge of the cargo. Edge protectors also help to keep the cargo in position by pressing against the cargo over larger areas than the cable alone.

Known edge protectors are not entirely satisfactory for the range of applications in which they are employed. For example, existing edge protectors are time-consuming to use. They typically require the user to loosen a winch tensioning the cable in the tie-down assembly. Once the tension in the cable is reduced, more time is needed to physically bend the cable to interface with the edge protector properly, such as by inserting the cable around and through prongs.

Further, conventional edge protectors require significant physical strength to use. Bending high-strength cables and inserting them into existing edge protectors is physically taxing. In addition to being onerous to use from a strength and exertion standpoint, known edge protectors typically require using two hands to operate. Moreover, conventional edge protectors often require the user to carry extra tools and a heavy ratchet bar.

Another limitation of existing edge protectors is their potential for injuring the operators using them. Conventional edge protectors create pinch points, which can cause significant pain or injury if the user's finger or hand is pinched between the cable and the edge protector. Further, conventional edge protectors require the user to handle the cable directly, which can cause the user to be poked and injured by sharp, frayed cables.

In addition, conventional edge protectors are prone to damage cargo because they include sharp edges and support cables over only a narrow portion of their overall width. The sharp edges can abrade the cargo and exert extreme localized compressive forces on the cargo. Some edge protector examples utilize softer materials, such as relatively soft rubber, to avoid damaging cargo with sharp edges. However, the currently existing edge protectors with softer materials tend to readily deform when the cable is tensioned, which causes the cable to damage the cargo through the edge protector. The non-existent or quite narrow cable support width provided by conventional edge protectors leads to cables falling off the supports, breaking the support surfaces, and/or damaging the cargo underneath the edge protector.

Thus, there exists a need for edge protectors that improve upon and advance the design of known edge protectors. Examples of new and useful edge protectors relevant to the needs existing in the field are discussed below.

A United States patent filing with disclosure relevant to edge protectors includes U.S. Pat. No. 5,878,548. The complete disclosure of this listed U.S. patent filing is herein incorporated by reference for all purposes.

SUMMARY

The present disclosure is directed to edge protectors to protect cargo from damage caused by a cable. The edge protectors include a body, a first retainer, and a first ramp. The body is complementarily configured with an edge of the cargo and is configured to cover the edge when the cable secures the cargo. The first retainer is mounted to the body and is configured to receive and laterally retain the cable when the cable secures the cargo. The first ramp is mounted to the body proximate the first retainer. The first ramp is configured to guide the cable into the first retainer and is configured to cooperate with the first retainer to laterally retain the cable in the first retainer when the cable secures the cargo. In some examples, the edge protector includes a second retainer, a second ramp, and/or a bolster.

DETAILED DESCRIPTION

The disclosed edge protectors will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various edge protectors are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Edge Protectors for Load Securement

With reference to the figures, edge protectors for load securement will now be described. The edge protectors discussed herein cooperate with tie-down cable assemblies to secure cargo to delivery vehicles, such as centerbeam railcars. The edge protectors disclosed in this application secure to a high-strength cable while protecting the cargo from damage due to the cable exerting compressive forces on localized areas of the cargo, such as on an outer edge of the cargo. The presently described edge protectors also help to keep the cargo in position by pressing against the cargo over larger areas than the cable alone.

The reader will appreciate from the figures and description below that the presently disclosed edge protectors address many of the shortcomings of conventional edge protectors. For example, the presently described edge protectors are faster to use than conventional edge protectors because they do not require the user to loosen a winch tensioning the cable in the tie-down assembly. Further, the edge protectors described in this application are less time consuming to use because the user does not need to spend time physically bending the cable to interface with the edge protector properly, such as by inserting the cable around and through prongs.

Another improvement over conventional edge protectors is that less physical strength is required to use the presently described edge protectors. Less physical strength is required because the user is not required to bend high-strength cables as is necessary to insert cables into existing edge protectors. Further improving over conventional edge protectors, the edge protectors discussed in this application may be used with a single hand instead of requiring two hands and do not require the user to carry extra tools and heavy ratchet bars.

Importantly, the edge protectors discussed herein reduce the risk of injuring the operators using them. The presently described edge protectors avoid the pinch-points common with conventional edge protectors, which helps avoid the user's finger or hand being pinched between the cable and the edge protector that can result in significant pain or injury. The edge protectors described herein also minimize the user's need to directly handle the cable, which reduces the risk that the user will be poked by frayed cables.

The edge protectors discussed below do not include sharp edges like existing edge protectors to avoid abrading the cargo and to avoid exerting damaging localized compressive forces on the cargo. The presently described edge protectors are sufficiently rigid to withstand forces from the cables under tension without deforming. By maintaining their shape under high-tension forces and by providing bolster support across substantially the entire width of the edge protector, the edge protectors described below help protect the cargo from damage from the cable.

Contextual Details

Ancillary features relevant to the edge protectors described herein will first be described to provide context and to aid the discussion of the edge protectors.

Delivery Vehicle

Delivery vehicles suitable for use with the edge protectors discussed below are any vehicles used to transport cargo with a cable tie-down system. Delivery vehicles may include railcars, cargo ships, cargo airplanes, semi-truck trailers, flatbed trailers, pickup trucks, moving trucks, and the like.

Figure 1:
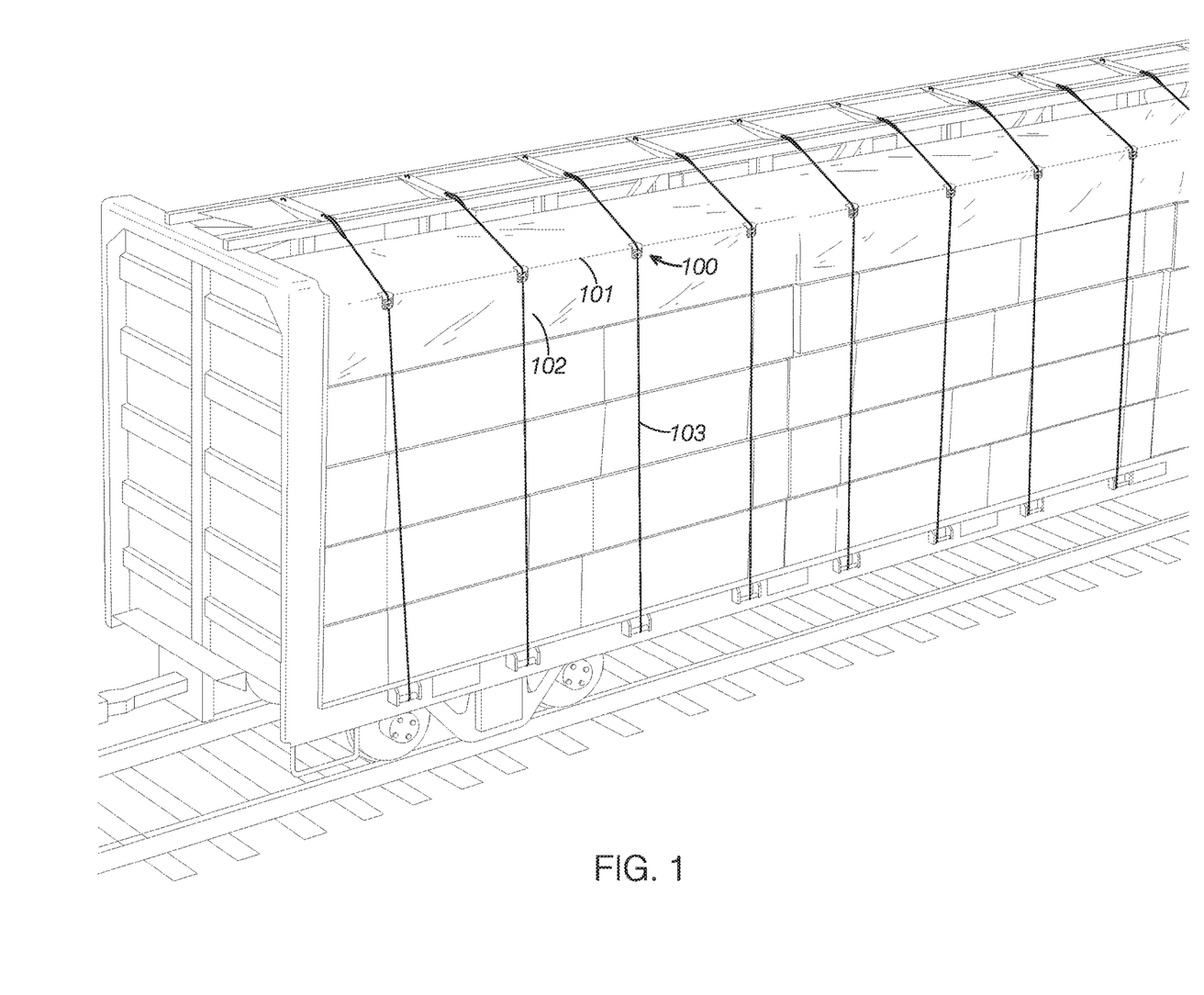
FIG. 1 is a perspective view of a first embodiment of an edge protector positioned on the corner of finished lumber loaded onto a centerbeam railcar with a cable extending from the centerbeam of the railcar to a winch with the edge protector disposed on the cable.
Figure 2:
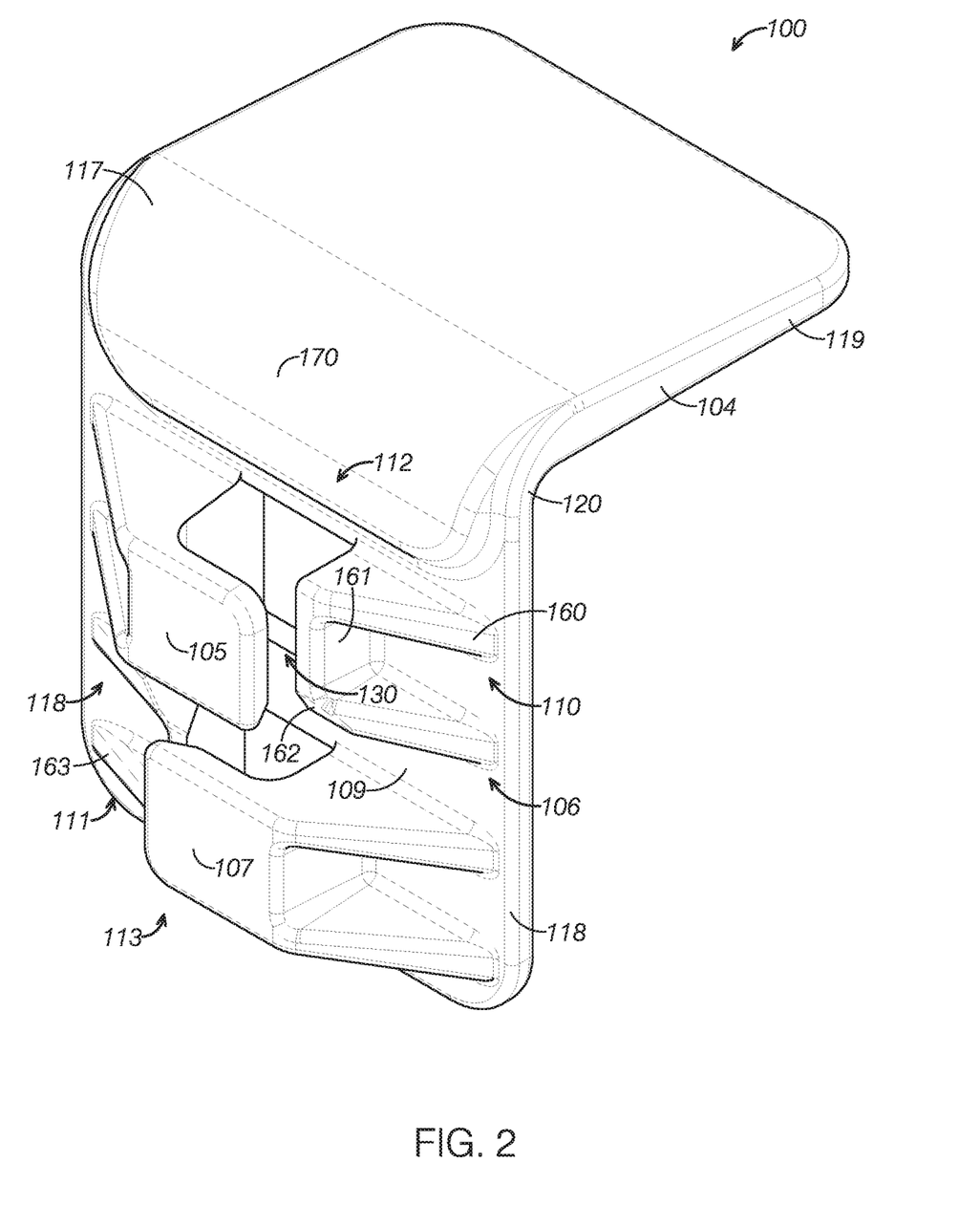
FIG. 2 is a front top perspective view of the edge protector shown in FIG. 1.
Figure 3:
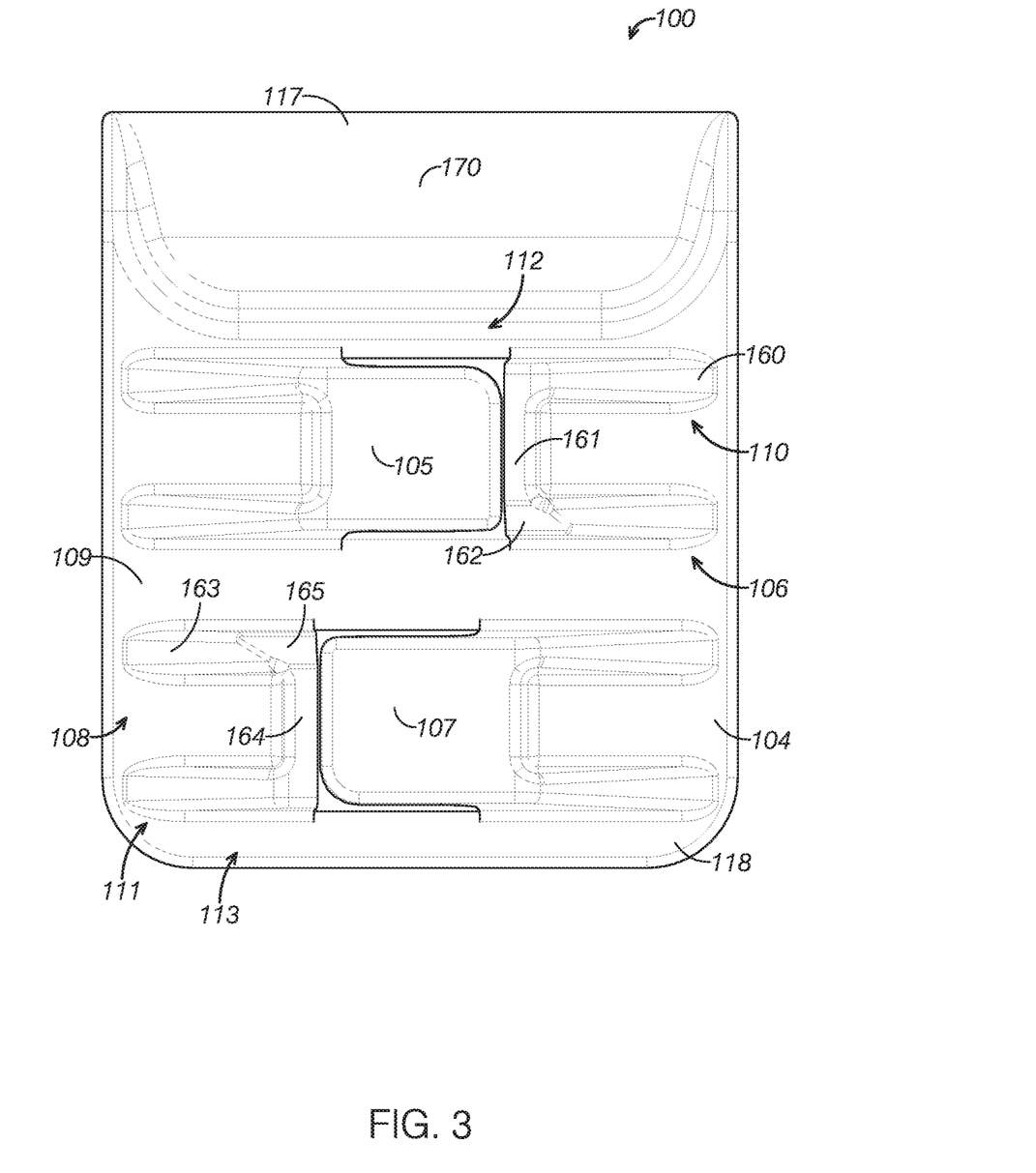
FIG. 3 is a front elevation view of the edge protector shown in FIG. 1.

FIG. 1 depicts an example of a centerbeam railcar, which would find ready application for the edge protectors discussed below. Centerbeam railcars include an elevated beam extending along the longitudinal center of the railcar along with a plurality of winches disposed along the outer periphery of the railcar. Cargo is loaded underneath the central beam, cables and edge protectors are placed over the cargo, and then the cables are winched down tight on the cargo to secure the cargo in place on the railcar. Semi-trucks and other road vehicles may include similar cable and winch systems.

Cable

Cables, such as a cable 103 shown in the figures, are used to secure cargo in delivery vehicles. The edge protectors described below couple to cables in a position between the cable and the cargo secured by the cable. Often the cables are high-strength cables formed of braided strands of wire. However, the term cable is used for convenience and should be understood to include wire ropes, straps, cords, chains, and all other forms of elongate tension bearing members.

More broadly, the cable may be any currently known or later developed type of cable. The reader will appreciate that a variety of cable types exist and could be used in place of the cable shown in the figures. In addition to the types of cables existing currently, it is contemplated that the edge protectors described herein could incorporate new types of cables developed in the future.

The size of the cable may be varied as needed for a given application. In some examples, the cable is larger relative to the other components than depicted in the figures. In other examples, the cable is smaller relative to the other components than depicted in the figures. Further, the reader should understand that the cable and the other components may all be larger or smaller than described herein while maintaining their relative proportions.

In the present example, cable 103 is composed of metal. However, the cable may be composed of any currently known or later developed material suitable for the applications described herein for which it is used.

Tie-Down System

Tie-down systems are used to more securely secure cargo by increasing the tension of cables acting on the cargo. The edge protectors described below may be used to spread out the force of a cable on the cargo when the cable is tensioned by the tie-down system. Tie-down systems typically include a winch or ratchet and a cable. The edge protectors described below are designed to work with any currently known or later developed style or type of tie-down system.

Cargo

The edge protectors described below are used in conjunction with cables to secure cargo transported by a delivery vehicle. The cargo may be any currently known or later developed type of cargo. The reader will appreciate that a variety of cargo types exist and could be used in place of the cargo shown in the figures. In addition to the types of cargo existing currently, it is contemplated that the edge protectors described herein could incorporate new types of cargo developed in the future.

The ratio of cargo items to edge protector may be selected to meet the needs of a given application. The reader should understand that the ratio may be different in other examples than is shown in FIG. 1.

The shape of the cargo may be different than the specific examples shown in FIG. 1. The size of the cargo may be varied as needed for a given application. In some examples, the cargo is larger relative to the other components than depicted in the figures. In other examples, the cargo is smaller relative to the other components than depicted in the figures. Further, the reader should understand that the cargo and the other components may all be larger or smaller than described herein while maintaining their relative proportions.

Edge Protector

With reference to FIGS. 1-9, an edge protector 100 will now be described as a first example of an edge protector. The reader can see in FIG. 1 that edge protector 100 functions to protect an edge 101 of cargo 102 from damage caused by a cable 103 exerting force on edge 101 when securing cargo 102.

As shown in FIGS. 2-4 and 7-9, edge protector 100 includes a body 104, a first retainer 105, a first ramp 106, a second retainer 107, a second ramp 108, and a bolster 117. In other examples, the edge protector includes fewer components than depicted in the figures, such as not including a second retainer, a second ramp, and/or a bolster. In certain examples, the edge protector includes additional or alternative components than depicted in the figures.

The number of edge protectors used to secure cables on a given delivery vehicle may be selected to meet the needs of a given application. The reader should understand that the number of edge protectors may be different in other examples than is shown in the figures. For instance, some examples include additional or fewer edge protectors than shown in FIG. 1.

The shape of the edge protector may be adapted to be different than the specific examples shown in the figures to suit a given application. The size of the edge protector may be varied as needed for a given application. In some examples, the edge protector is larger relative to other features than depicted in the figures. In other examples, the edge protector is smaller relative to other features than depicted in the figures. Further, the reader should understand that the edge protector and the other features may all be larger or smaller than described herein while maintaining their relative proportions.

In the present example, edge protector 100 is composed of a polymer. However, the edge protector may be composed of any currently known or later developed material suitable for the applications described herein for which it is used. Suitable materials include metals, polymers, wood, and composite materials.

Body

The role of body 104 is to support the other components of edge protector 100 and to cover edge 101 when cable 103 secures cargo 102. The reader can see in FIG. 1 that body 104 is complementarily configured with edge 101 of cargo 102. Body 104 is configured to cover edge 101 when cable 103 secures cargo 102.

In the particular example shown in FIG. 1, body 104 is configured to bound cargo 102, which defines a rectilinear shape. Body 104 is positioned on edge 101 of cargo 102 and bounds cargo 102 in depth and height directions over the width of body 104. In other examples, the body is configured to bound cargo having shapes other than rectilinear, such as round, curved, triangular, flat, and irregular shapes.

Figure 4:
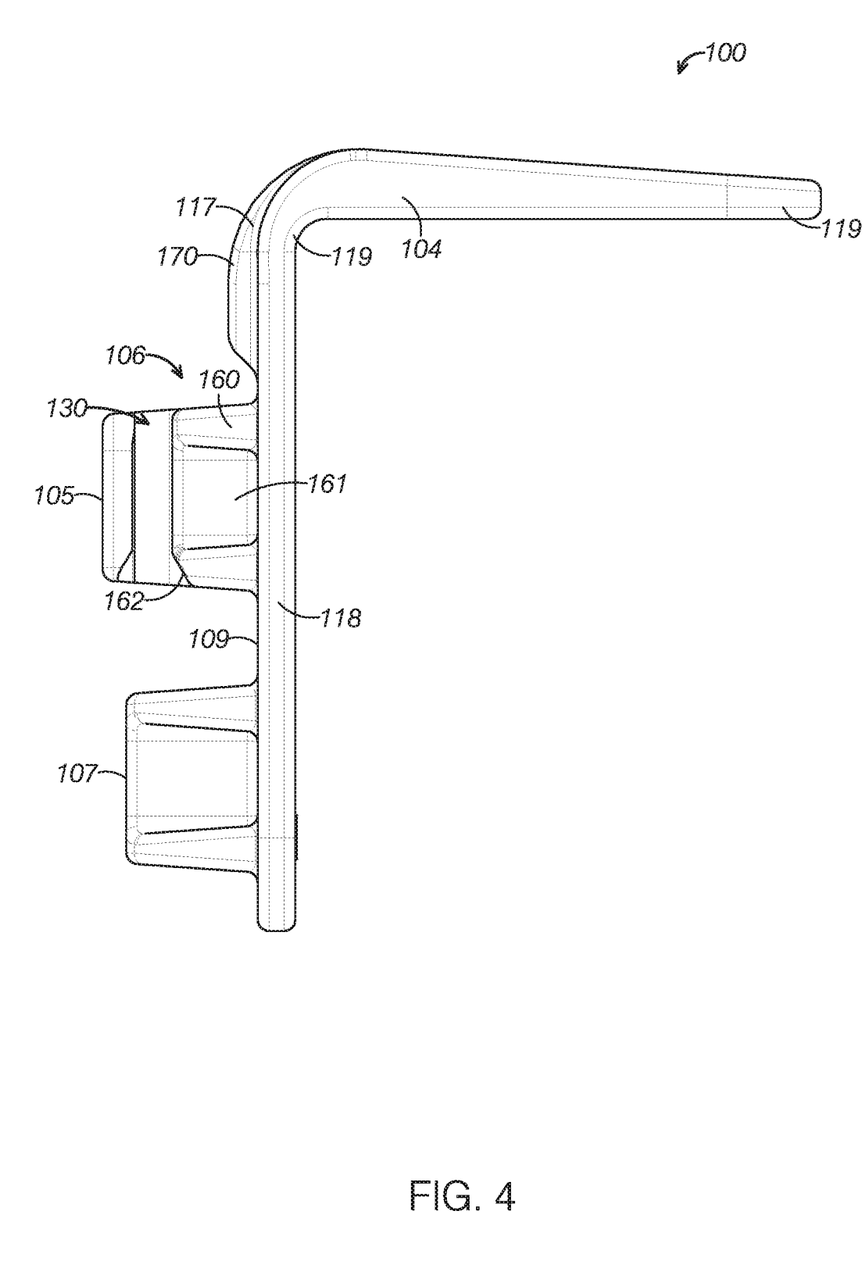
FIG. 4 is a right elevation view of the edge protector shown in FIG. 1.
Figure 5:
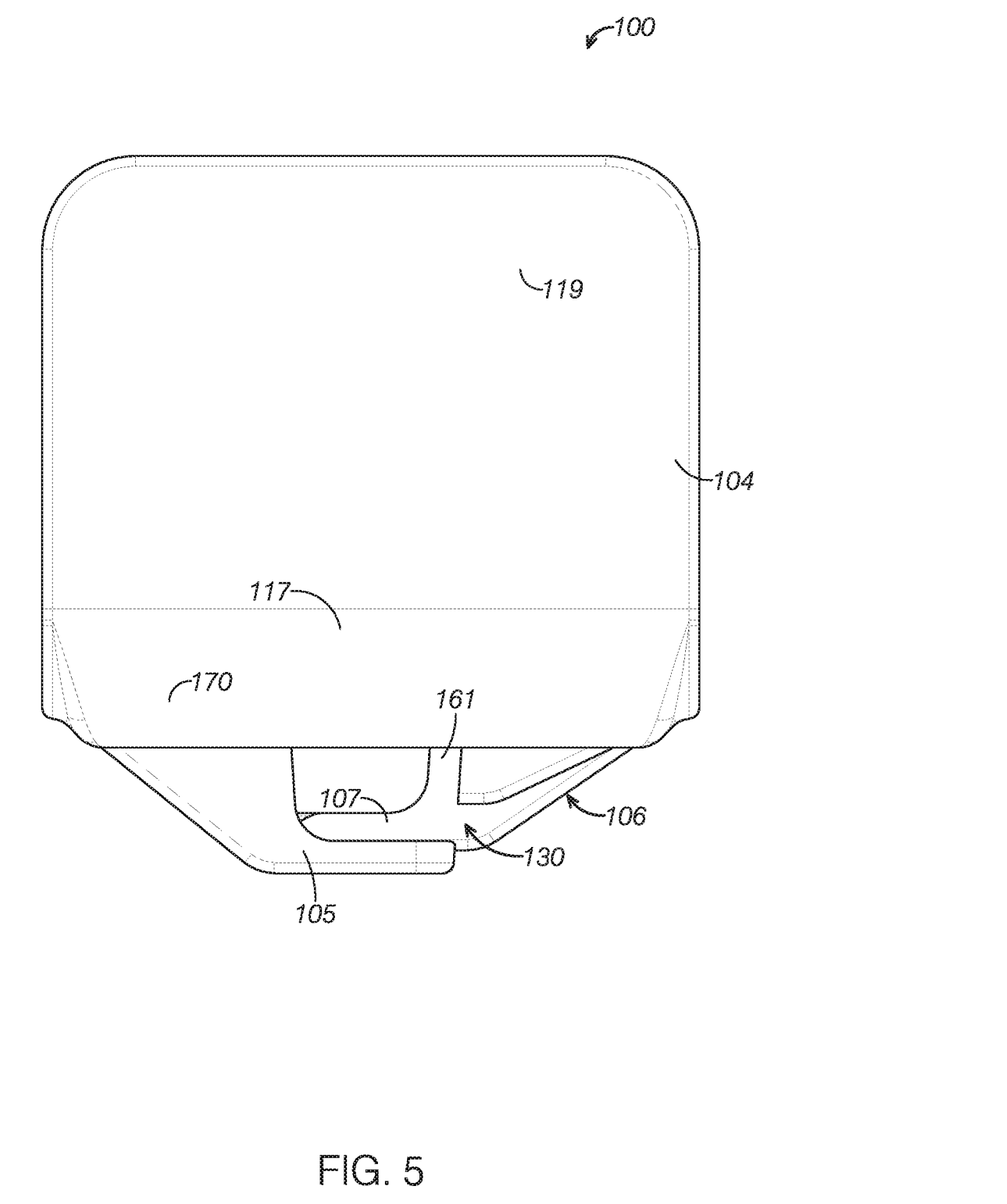
FIG. 5 is a top plan view of the edge protector shown in FIG. 1.

With reference to FIG. 4, body 104 includes a first arm 118, a second arm 119, and a shoulder 120. First arm 118 and second arm 119 are coupled together at shoulder 120. As depicted in FIGS. 1 and 4, shoulder 120 overlies edge 101 of cargo 102 when cable 103 secures cargo 102.

In other examples, the body includes a single arm and lacks a shoulder, such as a flat arm or a curved arm. In certain examples, the body includes more than two arms and may include more than one shoulder as well.

As shown in FIG. 4, second arm 119 extends transverse to first arm 118. As can be seen in FIG. 4, first arm 118 and second arm 119 define a substantially perpendicular angle between them; however, the arms may be oriented in angles other than strictly 90 degrees, such as between 45 and 135 degrees. The relative orientation of the arms may be selected to suit the shape and needs of a given cargo load. In examples where the cargo is milled lumber arranged in an overall rectilinear shape, a body with perpendicular arms is well suited to retaining the cargo in its rectilinear arrangement.

The shape of the arms may vary from the shapes depicted in FIGS. 1-9. For example, the arms may be curved, such as circular or oval; triangular; trapezoidal; a regular polygon; or an irregular shape. Further, the thickness of the arms may be thicker or thinner than depicted in FIGS. 2-9. The length and width of the arms may be selected to suit a given cargo application.

Figure 7:
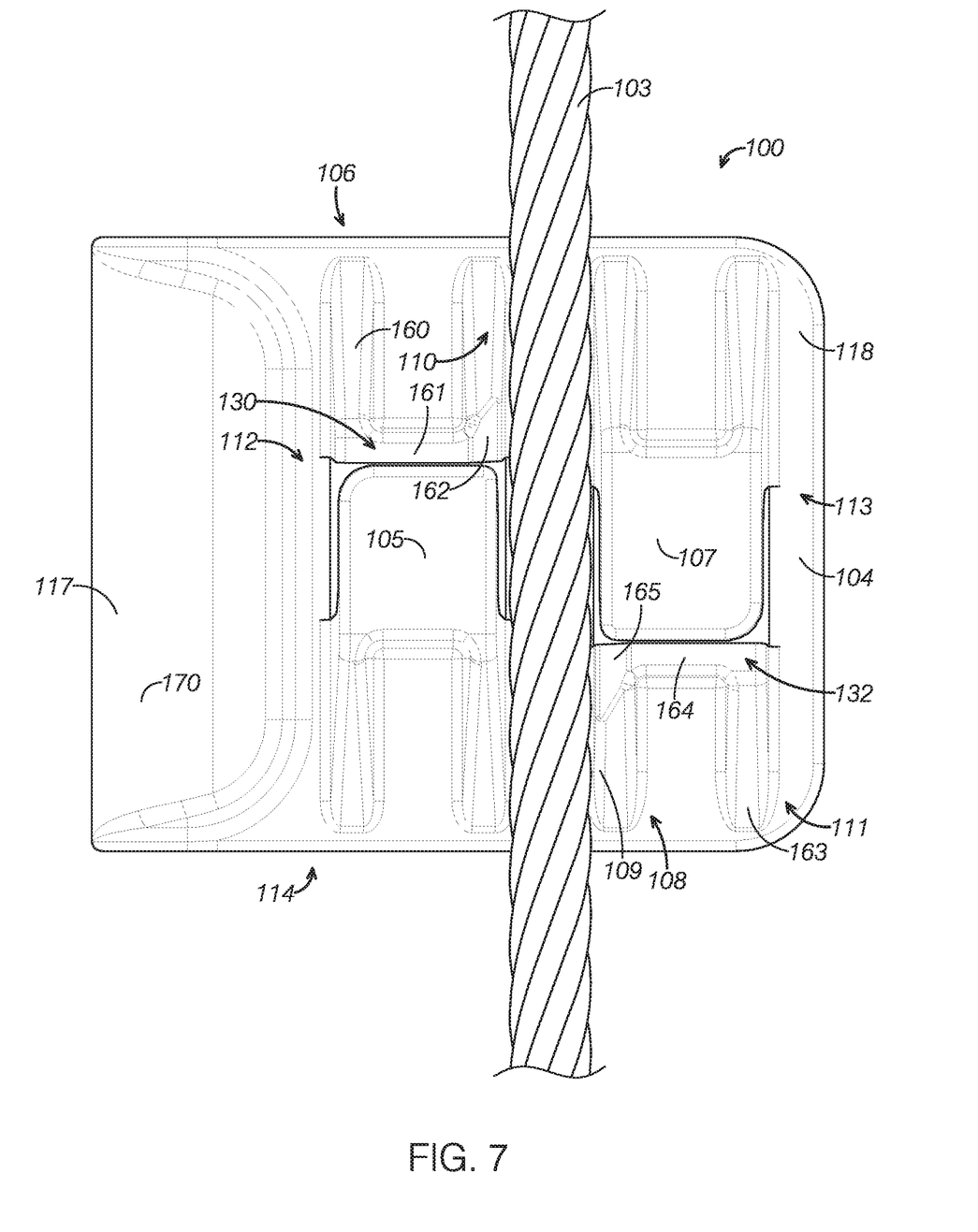
FIG. 7 is a front elevation view of the edge protector shown in FIG. 1 rotated 90-degrees counterclockwise from vertical in a setup orientation with a cable extending vertically in a setup channel.
Figure 8:
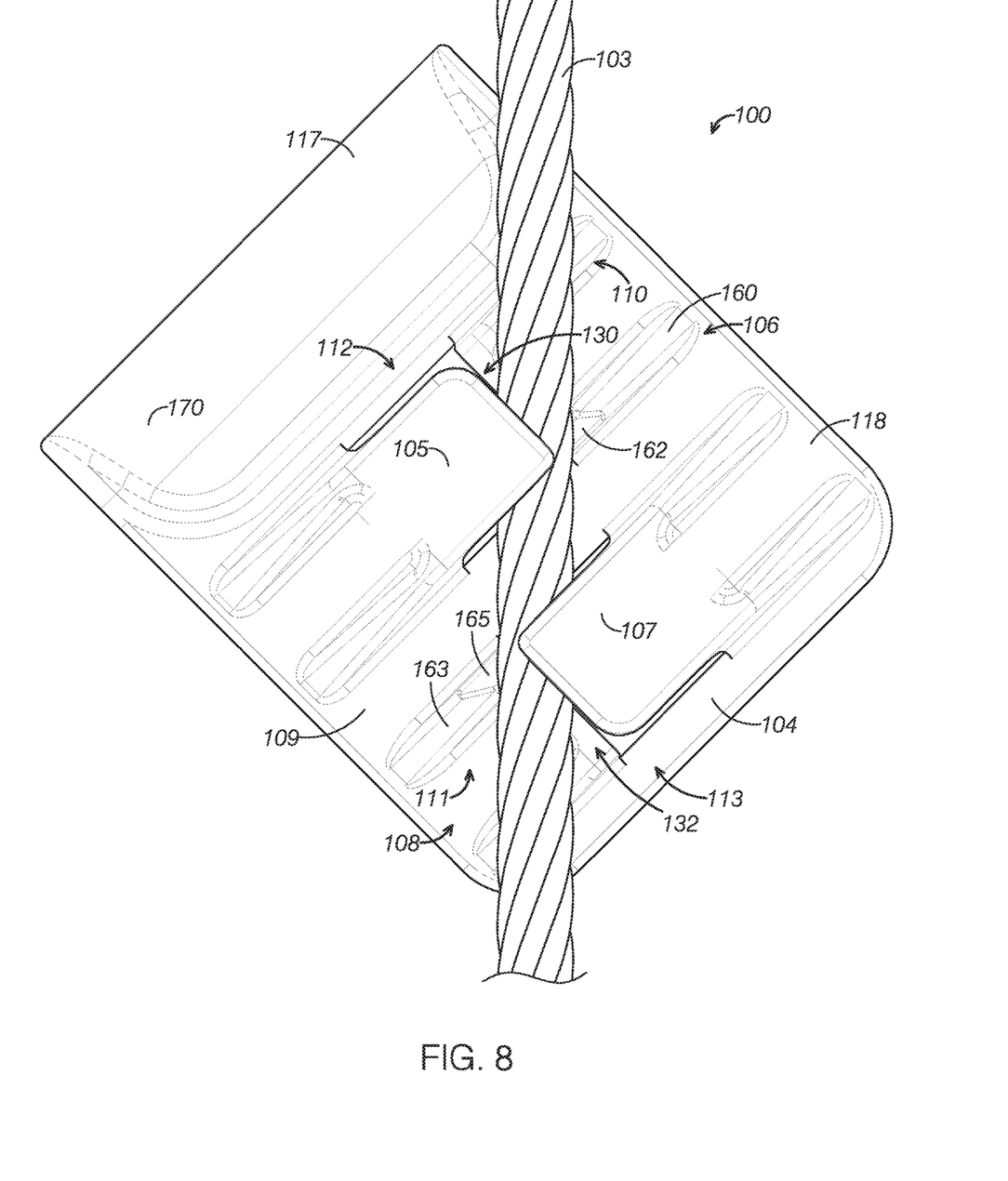
FIG. 8 is a front elevation view of the edge protector shown in FIG. 1 rotated 45-degrees counterclockwise from vertical in a transition orientation with the cable extending vertically and disposed on first and second ramps.
Figure 9:
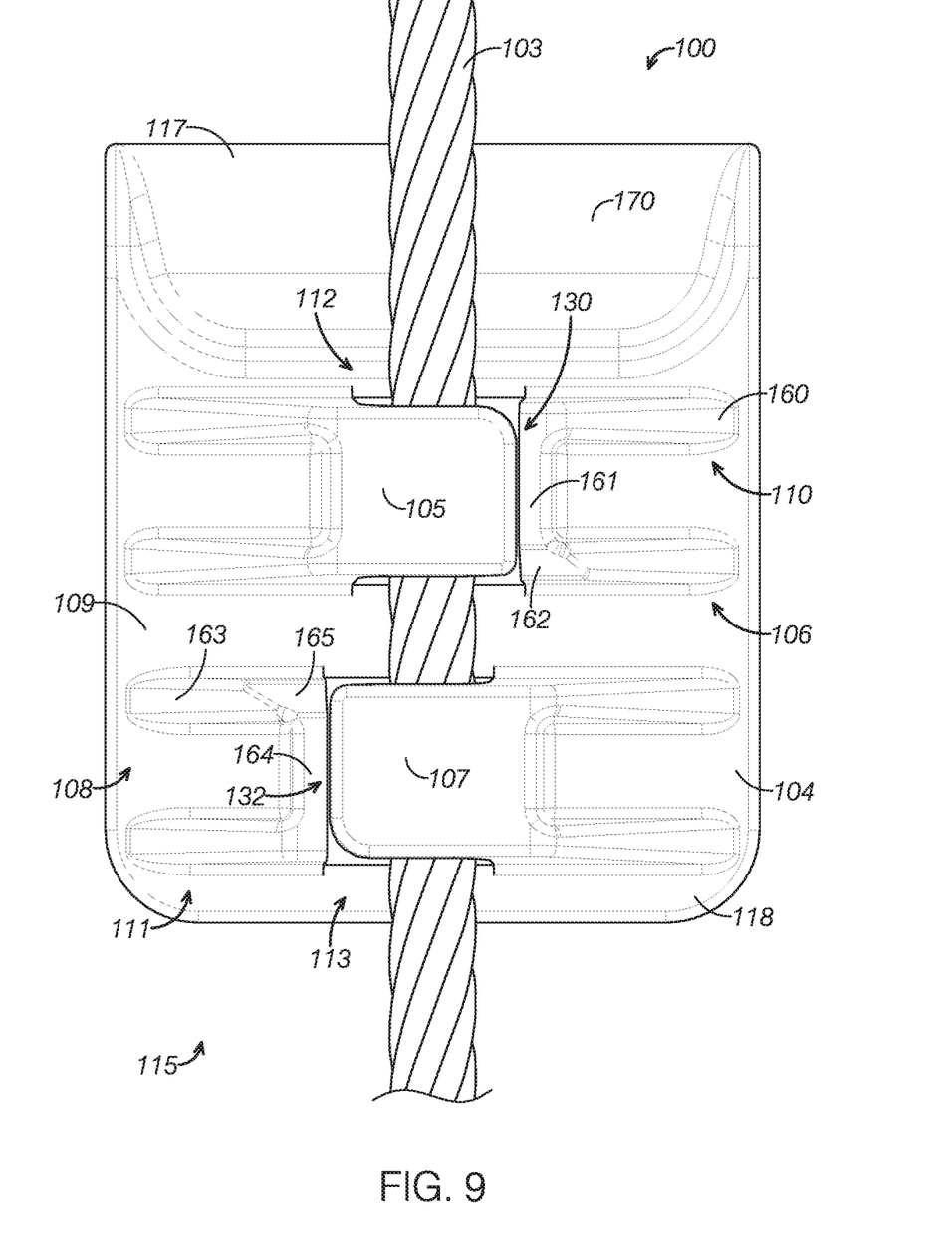
FIG. 9 is a front elevation view of the edge protector shown in FIG. 1 rotated 0-degrees counterclockwise from vertical in a retention orientation with the cable extending vertically and disposed in first and second retainers.

As depicted in FIGS. 7-9, body 104 is configured to be rotated between a setup orientation 114, shown in FIG. 7, and a retention orientation 115, shown in FIG. 9. FIG. 8 depicts a transition orientation between setup orientation 114 and retention orientation 115. As depicted in FIGS. 7-9, setup orientation 114 and retention orientation 115 are 90-degrees apart.

As shown in FIGS. 7-9, rotating body 104 from setup orientation 114 to retention orientation 115 causes cable 103 to move from setup channel 109 into first retainer 105 and into second retainer 107. Cable 103 moves from setup channel 109 into first retainer 105 and into second retainer 107 via first ramp 106 and second ramp 108, respectively.

In the present example, body 104 is composed of a polymer. However, the body may be composed of any currently known or later developed material suitable for the applications described herein for which it is used. Suitable materials include metals, polymers, wood, and composite materials.

The size of the body may be varied as needed for a given application. In some examples, the body is larger relative to the other components than depicted in the figures. In other examples, the body is smaller relative to the other components than depicted in the figures. Further, the reader should understand that the body and the other components may all be larger or smaller than described herein while maintaining their relative proportions.

The shape of the body may be adapted to be different than the specific examples shown in the figures to suit a given application. For example, the body may include a face having the shape of a regular or irregular polygon, such as a circle, oval, triangle, square, rectangle pentagon, and the like. Additionally or alternatively, the body may include a face having an irregular shape.

Setup Channel

With reference to FIGS. 2, 3, and 7-9, the reader can see that body 104, first retainer 105, first ramp 106, second retainer 107, and second ramp 108 collectively define a setup channel 109 in the space between first retainer 105 and second retainer 107. Setup channel 109 serves to initially orient cable 103 within edge protector 100 prior to securing cable 103 within first retainer 105 and second retainer 107.

The reader can see in FIG. 7 that setup channel 109 is complementarily configured with cable 103 to receive cable 103 when body 104 is in setup orientation 114. As shown in FIGS. 7-9, setup channel 109 extends laterally relative to cable 103 when cable 103 is retained in first retainer 105 and in second retainer 107 and body 104 is in retention orientation 115.

As shown in FIGS. 7-9, setup channel 109 roughly corresponds to the diameter of cable 103. However, the size of the setup channel may be varied as needed for a given application. In some examples, the setup channel is larger relative to the other components than depicted in the figures. In other examples, the setup channel is smaller relative to the other components than depicted in the figures. Further, the reader should understand that the setup channel and the other components may all be larger or smaller than described herein while maintaining their relative proportions.

The shape of the setup channel may be adapted to be different than the specific examples shown in the figures to suit a given application. For example, the setup channel may include curved or stepped sidewalls and/or a curved or stepped floor rather than the rectilinear channel shape depicted in the figures.

Retainers

First retainer 105 and second retainer 107 function to receive and laterally retain cable 103 when cable 103 secures cargo 102. With reference to FIGS. 2-4 and 7-9, first retainer 105 and second retainer 107 are mounted to body 104. The reader can see in FIGS. 2, 3 and 7-9 that second retainer 107 is longitudinally spaced from first retainer 105. As depicted in FIG. 9, second retainer 107 is longitudinally aligned with first retainer 105 such that cable 103 extends longitudinally through both first retainer 105 and second retainer 107 when cable 103 secures cargo 102.

As can be seen in FIGS. 2-5 and 7-9, first retainer 105 and second retainer 107 form partial conduit enclosures that structurally surround the lateral or radial sides of cable 103. The partial conduit enclosures define longitudinal openings for cable 103 to extend through longitudinally unimpeded. First retainer 105 and second retainer 107 substantially surround the lateral or radial sides of cable 103.

With reference to FIGS. 2-5 and 7-9, the reader can see that first retainer 105 and second retainer 107 define a first entryway 130 and a second entryway 132 proximate first ramp 106 and second ramp 108, respectively. First entryway 130 and second entryway 132 enable cable 103 to selectively enter and exit first retainer 105 and second retainer 107 when edge protector 100 is rotated between setup orientation 114 and retention orientation 115.

Figure 6:
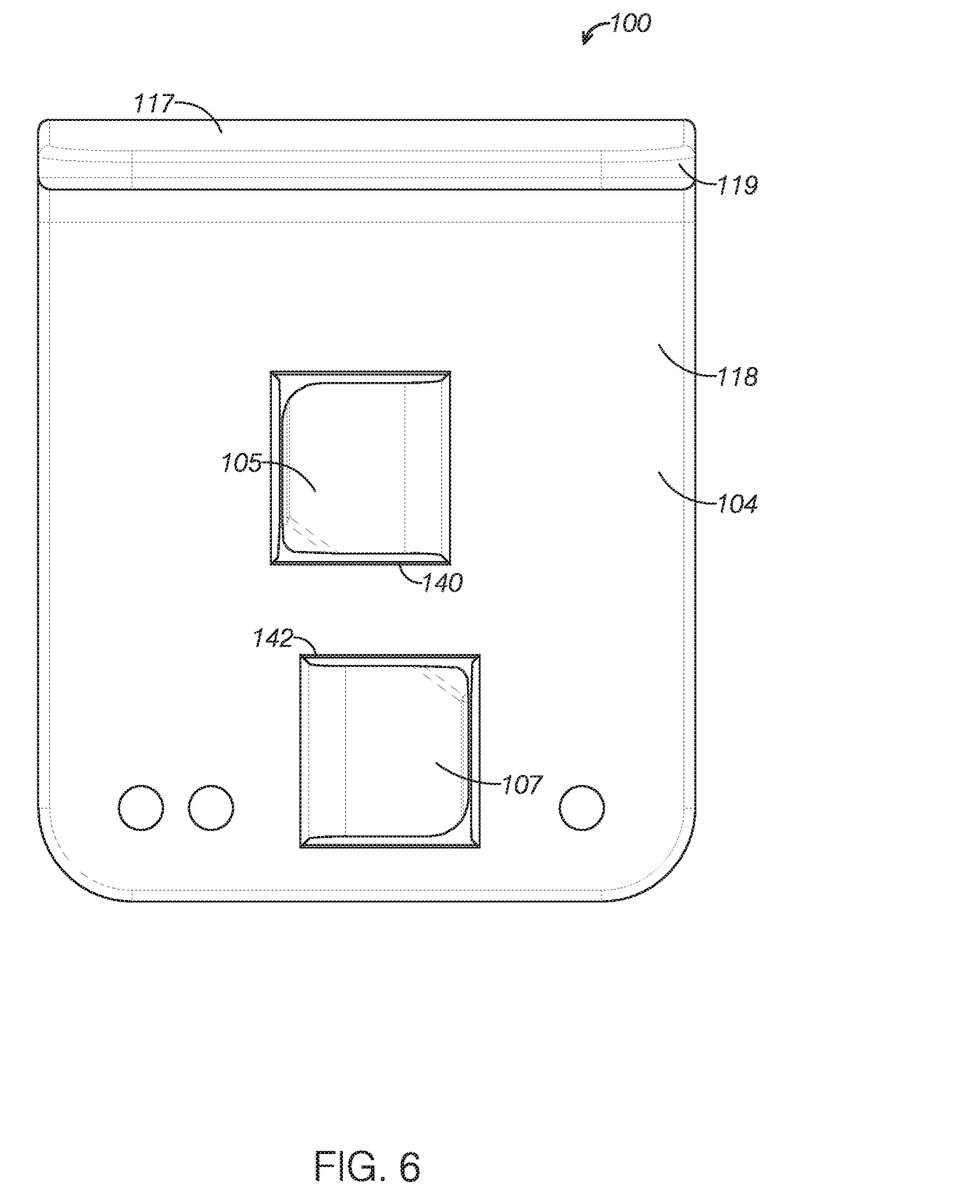
FIG. 6 is a rear elevation view of the edge protector shown in FIG. 1.

The reader can see in FIG. 6 that the retainers define a first port 140 and a second port 142 extending through first arm 118 of body 104. Cable 103 is restricted from passing through first port 140 and second port 142 when retained in first retainer 105 and second retainer 107 because cable 103 extends longitudinally beyond the dimensions of first port 140 and second port 142.

The shape of the retainer may be adapted to be different than the specific examples shown in the figures to suit a given application. For example, the retainers may include a face having the shape of a regular or irregular polygon, such as a circle, oval, triangle, square, rectangle pentagon, and the like. Additionally or alternatively, the retainers may include a face having an irregular shape. In three dimensions, the shape of the retainers may be a sphere, a pyramid, a cone, a cube, and variations thereof, such as a hemisphere or a frustoconical shape.

In the present example, the retainers are composed of a polymer. However, the retainers may be composed of any currently known or later developed material suitable for the applications described herein for which it is used. Suitable materials include metals, polymers, wood, and composite materials.

The size of the retainers may be varied as needed for a given application. In some examples, the retainers are larger relative to the other components than depicted in the figures. In other examples, the retainers are smaller relative to the other components than depicted in the figures. Further, the reader should understand that the retainers and the other components may all be larger or smaller than described herein while maintaining their relative proportions.

First ramp 106 and second ramp 108 are configured to guide cable 103 into first retainer 105 and into second retainer 107, respectively. Further, first ramp 106 and second ramp 108 cooperate with first retainer 105 and second retainer 107, respectively, to laterally retain cable 103 in first retainer 105 and second retainer 107 when cable 103 secures cargo 102.

As shown in FIGS. 2-4 and 7-9, first ramp 106 and second ramp 108 are mounted to body 104. First ramp 106 is mounted to body 104 proximate first retainer 105 and second ramp 108 is mounted to body 104 proximate second retainer 107. The reader can see in FIGS. 2, 3 and 7-9 that first ramp 106 is laterally aligned with first retainer 105 and second ramp 108 is laterally aligned with second retainer 107.

The reader can see in FIGS. 2-4 and 7-9 that first ramp 106 is on the same longitudinal side of setup channel 109 as first retainer 105 and on the same lateral side of body 104. Second ramp 108 is on the opposite longitudinal side of setup channel 109 than first ramp 106 and on the same longitudinal side of setup channel 109 and the same lateral side of body 104 as second retainer 107. The ramps are oriented in mirror image fashion to each other on opposite lateral and longitudinal sides of setup channel 109.

The mirror image orientations of the ramps and retainers enable transitioning cable 103 from setup channel 109 to each of the retainers to be concurrently accomplished by rotating edge protector 100 by 90 degrees. Rotating edge protector 90 degrees in the opposite direction moves cable 103 out of first retainer 105 and second retainer 107 back into setup channel 109.

First ramp 106 includes first rails 160, a first wall 161, and a first chamfered edge 162. Second ramp 108 includes second rails 163, a second wall 164, and a second chamfered edge 165.

First wall 161 is disposed proximate first retainer 105 and second wall 164 is disposed proximate second retainer 107. First wall 161 and second wall 164 function to restrict cable 103 from unintentionally exiting first retainer 105 and second retainer 107, respectively.

With reference to FIGS. 2-4 and 7-9, first chamfered edge 162 is disposed proximate first retainer 105. Second chamfered edge 165 is disposed proximate second retainer 107. First chamfered edge 162 functions to guide cable 103 into first retainer 105 as cable 103 moves up first rails 160. Second chamfered edge 165 functions to guide cable 103 into second retainer 107 as cable 103 moves up second rails 163.

As depicted in FIGS. 2, 3 and 7-9, first rails 160 of first ramp 106 define a first slope 110 and second rails 163 of second ramp 108 define a second slope 111. As shown in FIGS. 2, 3 and 7-9, first slope 110 is opposite of second slope 111. The angle of the slopes may be steeper or shallower than depicted in the figures.

The low point of each ramp is disposed proximate the periphery of edge protector 100. The high point of each ramp is disposed proximate the retainers adjacent to them on the same longitudinal side of setup channel.

The ramps enable the portions of cable 103 in setup channel 109 closest to each ramp to slide up the ramps and into the corresponding retainers at the high point of the ramps. In particular, cable 103 concurrently slides up first rails 160 of first ramp 106 and up second rails 163 of second ramp 108 from setup channel 109 towards first chamfered edge 162 and second chamfered edge 165, respectively. First chamfered edge 162 and second chamfered edge 165 catch and direct cable 103 into first retainer 105 and second retainer 107, respectively.

In the present example, rotating edge protector 100 by 90-degrees clockwise causes cable 103 to move up the ramps and into the retainers. However, in some examples, the orientation of the ramps and retainers is reversed such that counterclockwise rotation of the edge protector moves the cable up the ramps and into the retainers.

In the present example, the ramps are composed of a polymer. However, the ramps may be composed of any currently known or later developed material suitable for the applications described herein for which it is used. Suitable materials include metals, polymers, wood, and composite materials.

The size of the ramps may be varied as needed for a given application. In some examples, the ramps are larger relative to the other components than depicted in the figures. In other examples, the ramps is smaller relative to the other components than depicted in the figures. Further, the reader should understand that the ramps and the other components may all be larger or smaller than described herein while maintaining their relative proportions.

The shape of the ramps may be adapted to be different than the specific examples shown in the figures to suit a given application. For example, the ramp may include a single inclined surface instead of rails. Additionally or alternatively, the ramps may include curved surfaces instead of flat inclines surfaces.

Guide Pairs

With reference to FIGS. 2, 3 and 7-9, the reader can see that first ramp 106 and first retainer 105 define a first guide pair 112. As further shown in FIGS. 2, 3 and 7-9, second ramp 108 and second retainer 107 define a second guide pair 113. The role of first guide pair 112 and second guide pair 113 is to guide and secure cable 103. As depicted in FIGS. 2, 3 and 7-9, first guide pair 112 is a longitudinally offset mirror image of second guide pair 113.

Bolster

As shown in FIGS. 1-5, and 9, bolster 117 overlies edge 101 of cargo 102 when cable 103 secures cargo 102 and is retained in first retainer 105. Bolster 117 functions to disperse forces from cable 103. Dispersing forces from cable 103 reduces the forces acting on cargo 102 secured by edge protector 100 when cable 103 is under tension.

Bolster 117 also functions to support cable 103 where it exits first retainer 105 and as cable 103 follows the contour of body 104. In the present example, bolster 117 assists with cable 103 following the contour of body 104 at the 90-degree transition occurring at shoulder 120.

As shown in FIGS. 1-9, bolster 117 includes a bolster surface 170 raised above body 104. Bolster surface 170 is disposed in a position adjacent to first retainer 105 to support cable 103 retained in first retainer 105 over a portion of cable 103 extending beyond first retainer 105. With reference to FIGS. 2-5 and 7-9, bolster 117 is longitudinally adjacent to first retainer 105. The reader can see in FIGS. 2, 3, 5, and 7-9 that bolster 117 extends laterally across a majority of the width of body 104.

The bolster may be any currently known or later developed type of bolster. The reader will appreciate that a variety of bolster types exist and could be used in place of the bolster shown in the figures. In addition to the types of bolsters existing currently, it is contemplated that the edge protectors described herein could incorporate new types of bolsters developed in the future.

The number of bolsters in the edge protector may be selected to meet the needs of a given application. The reader should understand that the number of bolsters may be different in other examples than is shown in the figures. For instance, some edge protector examples include additional or fewer bolsters than described in the present example.

The shape of the bolster may be adapted to be different than the specific examples shown in the figures to suit a given application. For example, the bolster may include a face having the shape of a regular or irregular polygon, such as a circle, oval, triangle, square, rectangle pentagon, and the like. Additionally or alternatively, the bolster may include a face having an irregular shape.

The size of the bolster may be varied as needed for a given application. In some examples, the bolster is larger relative to the other components than depicted in the figures. In other examples, the bolster is smaller relative to the other components than depicted in the figures. Further, the reader should understand that the bolster and the other components may all be larger or smaller than described herein while maintaining their relative proportions.

In the present example, bolster 117 is composed of a polymer. However, the bolster may be composed of any currently known or later developed material suitable for the applications described herein for which it is used. Suitable materials include metals, polymers, wood, and composite materials.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An edge protector for protecting an edge of cargo from damage caused by a cable exerting force on the edge when securing the cargo, the edge protector comprising:
   a body complementarily configured with the edge of the cargo and configured to cover the edge when the cable secures the cargo, wherein the body is defined by a first arm and a second arm joined at a shoulder;
   a first retainer mounted to the first arm of the body proximate to the shoulder and configured to receive and laterally retain the cable when the cable secures the cargo;
   a first ramp mounted to the first arm of the body,
      wherein the first ramp is proximate the first retainer,
      wherein the first ramp is defined by at least a first rail that slopes upward from a surface of the first arm to a wall of the first ramp, and
      wherein the wall of the first ramp opposes the first retainer and is configured to receive and laterally retain the cable when the cable secures the cargo;
   a second retainer mounted to the first arm of the body distal from the shoulder,
      wherein the second retainer is separated from the first retainer to define a set up channel between the first retainer and the second retainer, and
      wherein the second retainer is configured to receive and laterally retain the cable when the cable secures the cargo; and
   a second ramp mounted to the first arm of the body,
      wherein the second ramp is proximate the second retainer,
      wherein the second ramp is defined by at least a second rail that slopes upward from the surface of the first arm to a wall of the second ramp, and
      wherein the wall of the second ramp opposes the second retainer and is configured to receive and laterally retain the cable when the cable secures the cargo,
   wherein in response to orienting the edge protector in a setup orientation and placing the cable in the set up channel when the edge protector is in the setup orientation, the cable is between the first retainer and the second retainer,
   wherein in response to rotating the edge protector from the setup orientation to a retention orientation, the first ramp guides the cable into the first retainer so that the wall of the first ramp cooperates with the first retainer to laterally retain the cable in the first retainer when the cable secures the cargo, and the second ramp guides the cable into the second retainer so that the wall of the second ramp cooperates with the second retainer to laterally retain the cable in the second retainer when the cable secures the cargo.

2. The edge protector of claim 1, wherein the second retainer is longitudinally aligned with the first retainer such that the cable extends longitudinally through both the first retainer and the second retainer when the cable secures the cargo.

3. The edge protector of claim 2, wherein the second retainer is longitudinally spaced from the first retainer to define the set up channel.

4. The edge protector of claim 3, wherein the body, the first retainer, the first ramp, the second retainer, and the second ramp collectively define the setup channel in the space between the first retainer and the second retainer.

5. The edge protector of claim 4, wherein the setup channel extends laterally relative to the cable when the cable is retained in the first retainer and in the second retainer.

6. The edge protector of claim 5, wherein the first ramp is laterally aligned with the first retainer.

7. The edge protector of claim 6, wherein the second ramp is laterally aligned with the second retainer.

8. The edge protector of claim 7, wherein:
   the first rail of the first ramp defines a first slope;
   the second rail of the second ramp defines a second slope; and
   the first slope is opposite of the second slope.

9. The edge protector of claim 8, wherein:
   the first ramp and the first retainer define a first guide pair;
   the second ramp and the second retainer define a second guide pair; and
   the first guide pair is a longitudinally offset mirror image of the second guide pair.

10. The edge protector of claim 1, wherein the setup channel is complementarily configured with the cable to receive the cable when the body is in the setup orientation.

11. The edge protector of claim 10, wherein rotating the body from the setup orientation to the retention orientation causes the cable to move from the setup channel into the first retainer and into the second retainer via the first ramp and the second ramp, respectively.

12. The edge protector of claim 11, wherein the setup orientation and the retention orientation are ninety degrees apart.

13. The edge protector of claim 1, wherein the wall of first ramp defines a chamfered edge proximate a lower side of the first retainer, wherein the chamfered edge initially guides the cable into the first retainer when the edge protector is rotated from the set up orientation to the retention orientation.

14. The edge protector of claim 1, further comprising a bolster longitudinally adjacent to the first retainer.

15. The edge protector of claim 14, wherein the bolster overlies the edge of the cargo when the cable secures the cargo and is retained in the first retainer.

16. The edge protector of claim 15, wherein the bolster extends laterally across a majority of the width of the body.

17. The edge protector of claim 1, wherein the shoulder overlies the edge of the cargo when the cable secures the cargo.

* * * * *